United States Patent
Kim

(10) Patent No.: US 8,055,261 B2
(45) Date of Patent: Nov. 8, 2011

(54) DVB-H RECEIVING TERMINAL AND METHOD FOR FREQUENCY SCANNING IN DVB-H RECEIVING TERMINAL

(75) Inventor: Hyung-Hoon Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1023 days.

(21) Appl. No.: 11/942,358

(22) Filed: Nov. 19, 2007

(65) Prior Publication Data

US 2008/0134280 A1    Jun. 5, 2008

(30) Foreign Application Priority Data

Nov. 21, 2006 (KR) .................. 10-2006-0115089

(51) Int. Cl.
*H04W 4/00* (2009.01)
*H04W 36/00* (2009.01)

(52) U.S. Cl. ........................ 455/434; 455/437

(58) Field of Classification Search .......... 455/434, 455/437
See application file for complete search history.

(56) References Cited

U.S. PATENT DOCUMENTS

| | | | | |
|---|---|---|---|---|
| 5,724,660 A | * | 3/1998 | Kauser et al. | 455/456.2 |
| 5,946,604 A | * | 8/1999 | Bailey | 455/42 |
| 7,808,562 B2 | * | 10/2010 | Yen | 348/732 |
| 2005/0278752 A1 | * | 12/2005 | Fujii | 725/68 |

FOREIGN PATENT DOCUMENTS

JP      2005-175556      6/2005

* cited by examiner

*Primary Examiner* — Dwayne Bost
*Assistant Examiner* — Larry Sternbane
(74) *Attorney, Agent, or Firm* — The Farrell Law Firm, P.C.

(57) ABSTRACT

Disclosed is a method for efficiently scanning a frequency of a new broadcasting area when a DVB-H receiving terminal moves. To this end, the DVB-H terminal stores in advance in a table DVB-H frequency changes according to the broadcasting area based on each cell whenever it moves. Then, the DVB-H receiving terminal preliminarily scans the DVB-H frequency previously stored in response to the current cell when the DVB-H receiving terminal moves in the future. If there exist one or more DVB-H frequencies stored in response to each cell, the DVB-H receiving terminal scans the stored DVB-H frequencies one by one in order to find a DVB-H frequency having an intensity higher than a predetermined intensity. The DVB-H receiving terminal quickly and efficiently scans the DVB-H frequencies according to the priority without scanning within all the DVB-H frequency ranges so that it can effectively minimize power consumption.

9 Claims, 5 Drawing Sheets

DVB-H RECEIVING TERMINAL AND METHOD FOR FREQUENCY SCANNING IN DVB-H RECEIVING TERMINAL

PRIORITY

This application claims priority under 35 U.S.C. §119(a) to an application entitled "DVB-H Receiving Terminal and Method for Frequency Scanning in DVB-H Receiving Terminal" filed in the Korean Industrial Property Office on Nov. 21, 2006 and assigned Serial No. 2006-0115089, the contents of which are incorporated herein by reference.

BACKGROUND OF THE INVENTION

1. Field of the Invention

The present invention relates to a Digital Video Broadcasting-Handheld (DVB-H receiving terminal and a method for frequency scanning in the (DVB-H receiving) terminal. More particularly, the present invention relates to a DVB-H receiving terminal and a method for frequency scanning in the (DVB-H receiving) terminal. The terminal detects a frequency change in the broadcasting area according to the movement of the DVB-H receiving terminal and automatically converts the frequency into a frequency of new broadcasting area.

2. Description of the Related Art

DVB-H refers to a technology standard established in Europe for improving ground wave Digital TV (DTV) reception rate during movement, wherein H stands for 'Handheld'. DVB-H is a mobile multimedia standard supporting high quality voice and video service anytime and anywhere even when driving or walking.

The configuration of a service model using DVB-H will be described below. First, the transmitter side includes a network for interaction between a broadcasting provider and a communication provider based on a DVB-UMTS (DVB-Universal Mobile Telecommunication System) standard, in which the broadcasting provider transfers compressed data to the terminal in the transfer mode of DVB-H based on the DVB-AVC (DVB-ADVANCE VIDEO CODING) standard. Then, the terminal communicates with a mobile communication provider again by using a communication standard, such as DVB-UMTS/GSM (DVB-UMTS/Global System for Mobile) etc., and transfers receiving side information to the broadcasting provider through a communication network in real time.

In order to receive and reproduce broadcasting as described above, the DVB-H receiving terminal should receive signals from a broadcasting server and a repeater. First, the DVB-H receiving terminal must find a frequency including an actual signal in an area where a DVB-H signal exists, in order to receive the signal. When the frequency is found, the DVB-H receiving terminal should receive Service Information/Program Specific Information (SI/PSI) from the server on the basis of the found frequency.

SI/PSI includes Network Information Table (NIT) as well as information related to programs. In order to perform such operations as described above, when DVB-H applications are started or the DVB-H receiving terminal boots-up, the DVB-H receiving terminal should automatically start scanning for the existence of a DVB-H signal in the area where the terminal itself is located.

Generally, due to the common frequency interference, a DVB-H broadcasting network assigns different frequencies to the areas. Accordingly, the DVB-H receiving terminal scans the area at regularly spaced intervals according to its location so as to find a DVB-H frequency in an area where there is no DVB-H signal. When the DVB-H receiving terminal enters an area where there is a DVB-H signal, it checks whether the DVB-H frequency exists in the area.

In order to perform such an operation, it is necessary to continuously keep the RF module in an ON state, which influences the power consumption of the DVB-H receiving terminal.

As described above, since the conventional DVB-H receiving terminal assigns a different frequency to each of the cells when the conventional DVB-H receiving terminal starts DVB-H applications or moves from a shadow area of a DVB-H signal to a receivable area, the conventional DVB-H receiving terminal performs frequency scanning in order to find a DVB-H signal. To this end, the conventional DVB-H receiving terminal should individually scan various frequencies in the UFH signal band, i.e., DVB-H signal band, in order to find a DVB-H signal. That is, the frequency scanning efficiency of the conventional DVB-H receiving terminal decreases, because it repeats the process of frequency scanning in all of UHF signal bands according to each movement between cells. In addition, because it is necessary to continuously keep RF modules inside the DVB-H receiving terminal in an ON state in order to perform the operations above, the active state of the DVB-H receiving terminal also causes major battery consumption.

SUMMARY OF THE INVENTION

Accordingly, the present invention has been conceived to solve the above-mentioned problems occurring in the prior art. The present invention provides a DVB-H receiving terminal and a method for frequency scanning in the DVB-H receiving terminal, which can efficiently scan a frequency of a broadcasting area according to the location of the DVB-H receiving terminal.

Also, the present invention provides a DVB-H receiving terminal and a method for frequency scanning in a DVB-H receiving terminal for efficiently saving battery power without finding a frequency in a new broadcasting area every time the DVB-H receiving terminal moves.

In accordance with an aspect of the present invention, there is provided a method for frequency scanning in a DVB-H receiving terminal, the method including obtaining cell information of each cell and a DVB-H frequency having an intensity higher than a certain predetermined intensity; mapping the obtained DVB-H frequency to the cell information and storing the information in the form of a table; detecting a cell where the DVB-H receiving terminal itself currently belongs when there is a request for DVB-H frequency scanning; determining if the table includes the detected current cell information; and scanning preliminarily a DVB-H frequency corresponding to the current cell information described above when the table includes the detected current cell information as a result of the determination above.

In accordance with another aspect of the present invention, there is provided a DVB-H receiving terminal for frequency scanning, the DVB-H receiving terminal including, a memory for mapping a DVB-H frequency having, in advance, an intensity higher than a certain intensity to the cell information obtained from moving between cells, and storing the information in the form of the table; a digital broadcasting receiving unit for receiving a corresponding DVB-H frequency information according to the frequency scanned in moving between the cells in an area where a DVB-H signal exists; a Radio Frequency (RF) unit for receiving RF signals from a base station located in each of the cells; and a controller for judging whether the DVB-H receiving terminal moves between the cells by measuring the received signal intensity through the RF unit, obtaining the cell information and a DVB-H frequency having, in advance, an intensity higher than a certain intensity in moving between cells and storing the cell information and the DVB-H frequency in the memory, detecting a cell where the DVB-H receiving terminal itself belongs when there is a request for DVB-H frequency scanning, determining if the table includes the detected current cell information, and controlling to preliminarily scan a DVB-H frequency corresponding to the current cell information.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE PREFERRED EMBODIMENT

Hereinafter, one exemplary embodiment according to the present invention will be described with reference to the accompanying drawings. In the following description of the present invention, the detailed description of known functions and configurations incorporated herein is omitted to avoid making the subject matter of the present invention unclear.

The present invention provides a method for effectively scanning a frequency of new broadcasting area according to the location of a DVB-H receiving terminal. To this end, according to the present invention, the DVB-H terminal preliminarily stores a table including DVB-H frequency changes according to the broadcasting area for each cell, as it moves. Then, the DVB-H receiving terminal preliminarily scans the DVB-H frequency previously stored in response to the current cell when it moves in the next time. If there exist one or more DVB-H frequencies stored in response to each of the cells, the DVB-H receiving terminal scans the stored DVB-H frequencies in regular sequence so as to find a DVB-H frequency having intensity higher than a certain intensity. The DVB-H receiving terminal quickly and efficiently scans the DVB-H frequencies according to the priority without scanning within all of the DVB-H frequency ranges, which can minimize power consumption thereof.

Figure 1:
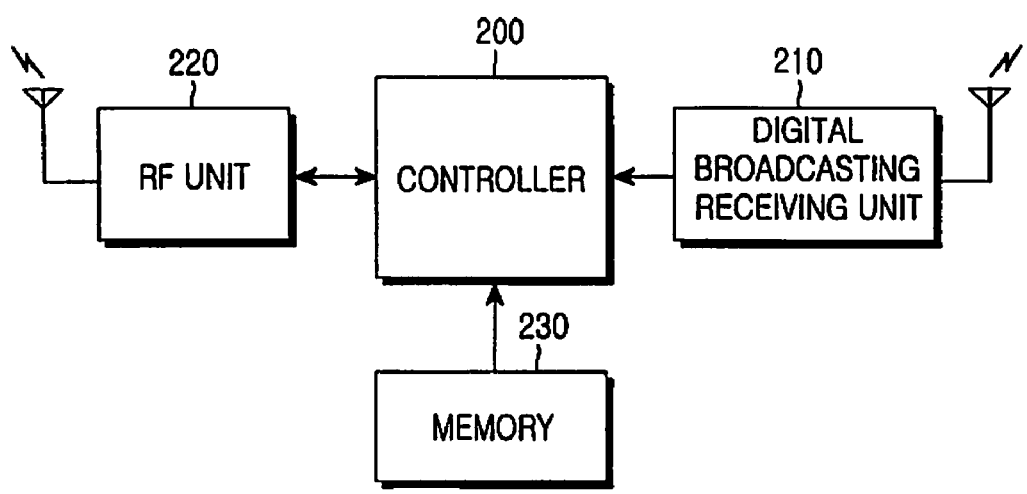
FIG. 1 is an outline block diagram illustrating a configuration of internal blocks of the DVB-H receiving terminal according to the present invention.

The components and operations of the DVB-H receiving terminal performing functions described above will be described with reference to FIG. 1. Referring to FIG. 1, a DVB-H receiving terminal according to the present invention includes a controller 200, a digital broadcasting receiving unit 210, a Radio Frequency (RF) unit 220 and a memory 230.

First, digital broadcasting receiving unit 210 receives a digital broadcasting signal from a service provider, i.e., a DVB-H transmission server, through a DVB-H network. The digital broadcasting signal is transferred to controller 200.

The operations where the digital broadcasting signal is demultiplexed, decoded and parsed into a video, audio data and a data signal, can be implemented inside controller 200. Since the operations of each of the components internally implemented are clearly understood by those skilled in the art, descriptions will be omitted.

Meanwhile, controller 200 analyzes Service Information/Program Specific Information (SI/PSI) in the digital broadcasting signal received from digital broadcasting receiving unit 210, searches for a frequency of corresponding broadcasting area and program information among the SI/PSI, and converts the frequency and program into a frequency and program which is suitable for current environment.

It is necessary to find the frequency to which the digital broadcasting signal belongs in order to receive the digital broadcasting signal. Accordingly, it is necessary to handover the frequency to another DVB-H frequency when the reception quality of a current DVB-H frequency is too low. Controller 200 scans other possible DVB-H frequencies via digital broadcasting receiving unit 210 and discovers which DVB-H frequency provides the best or better reception quality.

Therefore, whenever the DVB-H receiving terminal moves between cells in the area where the DVB-H signal exists, digital broadcasting receiving unit 210 receives the corresponding DVB-H frequency information based on the frequency scanning according to the embodiment of the present invention. Particularly, digital broadcasting receiving unit 210 preliminarily scans a predesignated DVB-H frequency in response to the current cell according to the embodiment of the present invention.

RF unit 220 performs a function of receiving the RF signals from base stations located in each of the cells through an antenna (ANT). The received signals intensities are used as a basis for judging movements between cells.

Meanwhile, controller 200 processes a voice signal and data according to a protocol for wireless Internet access and digital broadcasting, and controls each of the components of the DVB-H receiving terminal. As described below, without scanning the DVB-H frequency in all of the UHF signal band every time, controller 200 checks whether a DVB-H frequency previously scanned for the current cell exists, and performs frequency scanning by preliminarily using the corresponding frequency. Therefore, discussion about processing and control of common phone call, data communication, wireless Internet access and digital broadcasting by controller 200 will be omitted in the following description.

Usually, controller 200 of the DVB-H receiving terminal always monitors signal characteristics consecutively from a base station and selects a cell transmitted/received via a related base station and camps based on a standard of cell reselection. However, the mobility of controller 200 causes either the received signal intensity in a cell to change according to the location of the DVB-H receiving terminal even in an idle state, or the reception intensity within an adjacent cell to change.

Controller 200 measures the intensity of the received signal through RF unit 220 and compares the measured value with a preset critical value in order to judge the change of reception intensity. When the received signal intensity is less than or equal to the critical value, which implies that the signal in the current cell is unstable, it is necessary to reselect a cell so as to find a stable signal. First, after being turned on, the DVB-H receiving terminal enters a state of camping on an appropriate cell having the highest reception intensity in selecting an initial cell.

In this case, controller 200 stores in a memory 230 cell information of the mobile communication system, to which controller 200 itself belongs, in a table where cell information has been collected. The table is called Table_Phone_Info_ about_Cell in the embodiment of the present invention. The table stores a cell number of a cell, in which controller 200 is currently located, and information related to the cell. Whenever moving between cells, controller 200 additionally stores, in the table, numbers and information of the cell to which controller 200 has moved.

Table 1 shows a configuration of the table as described above.

TABLE 1

| cell number | other information about cell |
|---|---|
| cell #1 | other information about cell #1 |
| cell #2 | other information about cell #2 |
| cell #3 | other information about cell #3 |

Table 1 includes cell information as Wideband Code Division Multiple Access (WCDMA), Code Division Multiple Access (CDMA) and Global System for Mobile Communication (GSM) in a normal mobile communication system.

The memory where the table described above is stored includes a plurality of programs necessary for controlling operations of the DVB-H receiving terminal, Read Only Memory (ROM) for storing information, Random Access Memory (RAM) and a voice memory.

Hereinafter, a process of mapping the cell information to the DVB-H frequency according to the embodiment of the present invention will be described with reference to FIG. 2.

Figure 2:
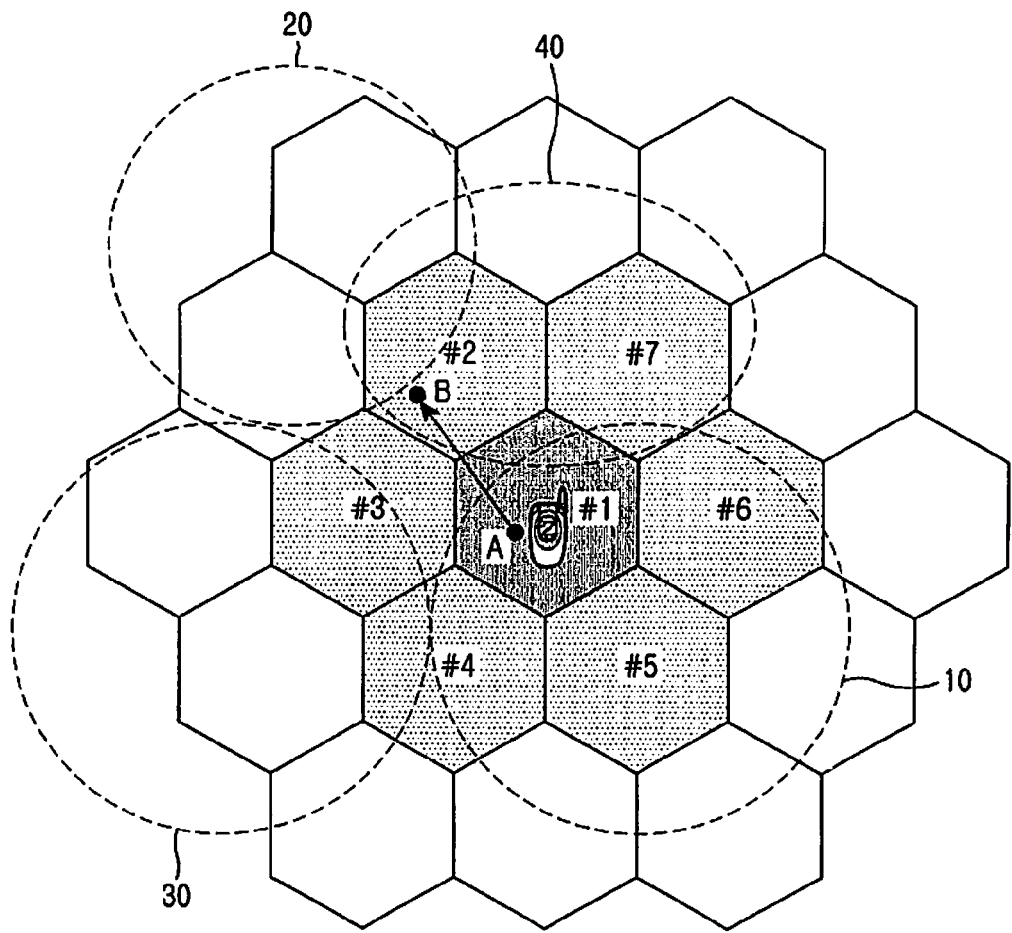
FIG. 2 shows a relationship between each cell of the mobile communication system and frequency domains based on broadcasting area according to the present invention.

As shown in FIG. 2, a mobile communication system based on Global System for Mobile Communication (GSM)/General Packet Radio Service (GPRS) as an example of a normal mobile communication system includes a plurality of cells (#1 to #7) defining each of the wireless coverage areas established by fixed site base stations located in each of the cells. For example, as illustrated in FIG. 2, cell #1 defines a wireless coverage area established by a base station located in cell #1, similarly to this, each of the other cells (#2 to #7) defines a related wireless coverage area established by the corresponding base station located in each of the cells (#2 to #7).

Meanwhile, since a DVB-H receiving terminal moves from point A to point B in the mobile communication system with a user together, the DVB-H receiving terminal consecutively monitors signal characteristics from the base stations in the cells (#1 to #7) and selects the corresponding cell through a related base station on the basis of a standard of random selection.

As described above, the DVB-H receiving terminal continuously monitors signal characteristics from the cells (#1 to #7). For instance, as shown in FIG. 2, as a DVB-H receiving terminal moves from point A to point B along the indicated path, the DVB-H receiving terminal moves from a coverage area related to the cell #1 to a coverage area related to another cell, such as cell #2.

When the DVB-H receiving terminal moves from point A corresponding to cell #1 to point B corresponding to cell #2, normally, the intensity of reception signal in cell #1 decreases while the intensity of reception signal in the cell #2 increases. Accordingly, the DVB-H receiving terminal performs handover according to its location between cells. In this case, since common frequency interference causes a DVB-H broadcasting network to assign mutually different frequencies to each of the areas, DVB-H frequency scanning should be performed during movement between cells. Mutually different frequency domains assigned to each of the areas are marked with dotted lines. Each frequency domain (10 to 40) may be formed one by one or overlapping with the other domains in response to each cell.

Therefore, the DVB-H receiving terminal scans a DVB-H frequency whenever it moves between cells. DVB-H frequency information scanned in each cell is both mapped to information about each cell and additionally stored in a table, as illustrated in table 1. An example will be illustrated below with reference to FIG. 2. A frequency domain indicated by reference numeral 10 is assigned to cell #1, mutually different frequency domains indicated by reference numeral 20 and 40 are assigned overlapping with each other in cell #2 and a frequency domain indicated by reference numeral 10 is assigned to cell #1.

A relationship between a DVB-H frequency domain and each cell of a mobile communication system will be described with reference to FIG. 2. When a DVB-H receiving terminal in cell #1, which uses an optimal DVB-H frequency called 'DVB-H_Freq_No1', moves to cell #2, the currently-used DVB-H frequency may not be an optimal frequency. Accordingly, the DVB-H receiving terminal scans other DVB-H frequencies and finds an optimal DVB-H frequency having an intensity higher than a certain intensity when it moves to cell #2. In this case, if one or more DVB-H frequencies overlap each other, the DVB-H receiving terminal can detect, in advance, all of the DVB-H frequencies having an intensity higher than a certain intensity in intensity order.

When DVB-H frequency information called 'DVB-H_Freq_No1' as a result of scanning in cell #1, DVB-H frequency information called 'DVB-H_Freq_No2' and 'DVB-H_Freq_No4' in cell #2, and DVB-H frequency information called 'DVB-H_Freq_No3' in cell #3 are acquired through the processes mentioned above, the DVB-H receiving terminal further stores the DVB-H frequency information in response to each of the cells.

A table additionally including the DVB-H frequency information as described above is illustrated in Table 2 below.

TABLE 2

| cell number | other information about cell | DVB-H frequency information |
|---|---|---|
| cell #1 | other information about cell #1 | DVB-H_Freq_No1 |
| cell #2 | other information about cell #2 | DVB-H_Freq_No2, DVB-H_Freq_No4 |
| cell #3 | other information about cell #3 | DVB-H_Freq_No3 |

Table 2 mentioned above shows a mapping relationship between the optimal DVB-H frequency information searched in each cell and information about each cell whenever the DVB-H receiving terminal moves between cells. Table 2 is updated through the DVB-H frequency scanning and stored whenever the DVB-H receiving terminal moves between cells through the handover.

In the meantime, when one or more DVB-H frequencies overlap each other according to another embodiment of the present invention, the DVB-H receiving terminal can detect, in advance, all of the DVB-H frequencies having an intensity higher than a certain intensity in intensity order. At this time, DVB-H frequencies including equal intensity may be detected. In preparation for the case described above, an embodiment of the present invention provides a method as described below.

The number of the DVB-H frequency scanning in a corresponding cell is counted in the scanning information table, like Table 2, whenever the DVB-H receiving terminal scans a DVB-H frequency. The counted number of scanning tells the frequency and the area, which have been used often by the DVB-H receiving terminal. That is, when DVB-H frequencies of equal intensity is detected in an area where many cells, in which various DVB-H frequencies may be detected, overlap each other, the DVB-H receiving terminal preliminarily uses a DVB-H frequency of the cell in which the number of scanning is larger than the number of scanning in other cells. In this case, because a place having a high probability that the DVB-H receiving terminal would move to that place corresponds to a place having a large number of scanning, the DVB-H receiving terminal uses the DVB-H frequency of the cell in which the number of scanning is larger than the number of scanning in other cells. When the DVB-H receiving terminal is situated in a place where the DVB-H frequency intensities of both cell #1 and cell #3, i.e., 'DVB-H_Freq_No1' and 'DVB-H_Freq_No3' respectively, are uniform as well as the numbers of scanning of cell #1 and cell #3 are equal to 1 and 3 respectively, the DVB-H receiving terminal uses the DVB-H frequency called 'DVB-H_Freq_No3' in cell #3 in which the number of scanning is larger than the number of scanning in other cells on the basis of the numbers of scanning.

Hereinafter, a process of the DVB-H receiving terminal capable of performing functions as described above will be described with reference to FIG. 3.

Generally, a DVB-H receiving terminal always consecutively monitors signal characteristics from a base station, selects a cell transmitted/received via a related base station, and camps on the cell. First, after the DVB-H receiving terminal is turned on, the DVB-H receiving terminal enters a state of camping on an appropriate cell having the highest reception intensity in selecting an initial cell.

Figure 3:
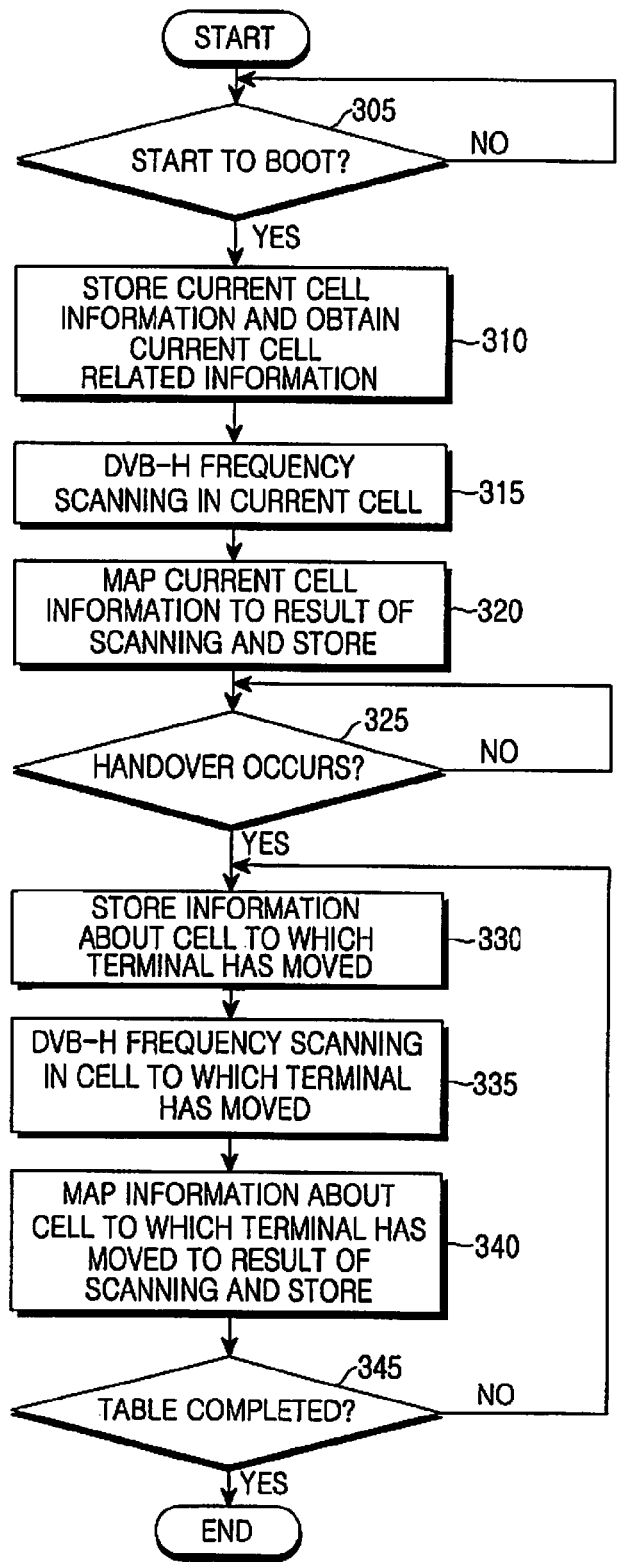
FIG. 3 is a flow chart for creating a scanning information table according to the present invention.

Referring to FIG. 3, the DVB-H receiving terminal determines whether a user starts booting in step 305 and obtains information about the cell to which the DVB-H receiving terminal itself belongs and the current cell-related information in step 310 when the DVB-H receiving terminal starts to boot. The cell-related information includes information about a cell, etc. which are adjacent to the current cell. Because the obtainment of the cell information and the cell-related information is the same as an obtainment of a usual mobile communication terminal, detailed description of the obtainment will be omitted. Continuously, the DVB-H receiving terminal performs DVB-H frequency scanning in the current cell in step 315 in order to find an appropriate DVB-H frequency having intensity higher than a certain intensity in response to the current cell. The scanning of the current cell described above is performed over the entire range of the DVB-H frequency, i.e., a UHF signal band for a cell, which the DVB-H receiving terminal has first visited. Through this procedure, the DVB-H receiving terminal individually finds various DVB-H frequencies so that it can select a DVB-H frequency having intensity higher than a certain preset intensity from among the found frequencies. The selected frequency is obtained as a result of scanning. The DVB-H receiving terminal maps the result of the scanning to the current cell information and stores the mapped result in the form of a table as shown in Table 1 in step 320.

The DVB-H receiving terminal determines if a handover occurs in step step 325. The handover follows a typical standard of a handover detection such as a case where a received signal intensity in the current cell becomes lower than a received signal intensity in an adjacent cell, and the like when the DVB-H receiving terminal moves between cells.

When handover occurs as a result of the determination, as a result of the judgment, when it is judged that handover is performed, the DVB-H receiving terminal stores the information about the cell where the DVB-H receiving terminal has moved in step 330, and performs DVB-H frequency scanning in the cell where the DVB-H receiving terminal has moved in step 335. Continuously, the DVB-H receiving terminal maps the result of the scanning described above, i.e., information about DVB-H frequency having an intensity higher than the intensity of the cell where the DVB-H receiving terminal has moved, and stores the mapped result in the form of a table as shown in Table 2 in step 340. That is, the DVB-H receiving terminal additionally stores the information about DVB-H frequency having intensity higher than a certain intensity in a table including information about each of cells. When there exist a plurality of DVB-H frequencies having intensity higher than a certain intensity, the DVB-H receiving terminal stores the information about DVB-H frequency with the corresponding cell information together with the frequency intensity order. In this manner, the DVB-H receiving terminal goes back to step 330 to repeatedly perform the process of both mapping information about the DVB-H frequency scanned in each of cells to the cell information and storing the mapped result until a table including a preset number of cell information is completed in step 345.

A scanning information table which has been completed through the process described above is used for quick DVB-H frequency scanning when a DVB-H receiving terminal starts DVB-H applications or moves from a shadow area to an area of available signals according to the embodiment of the present invention. The operations of the DVB-H receiving terminal for quick DVB-H frequency scanning will be described below with reference to FIG. 4 and FIG. 5.

Figure 4:
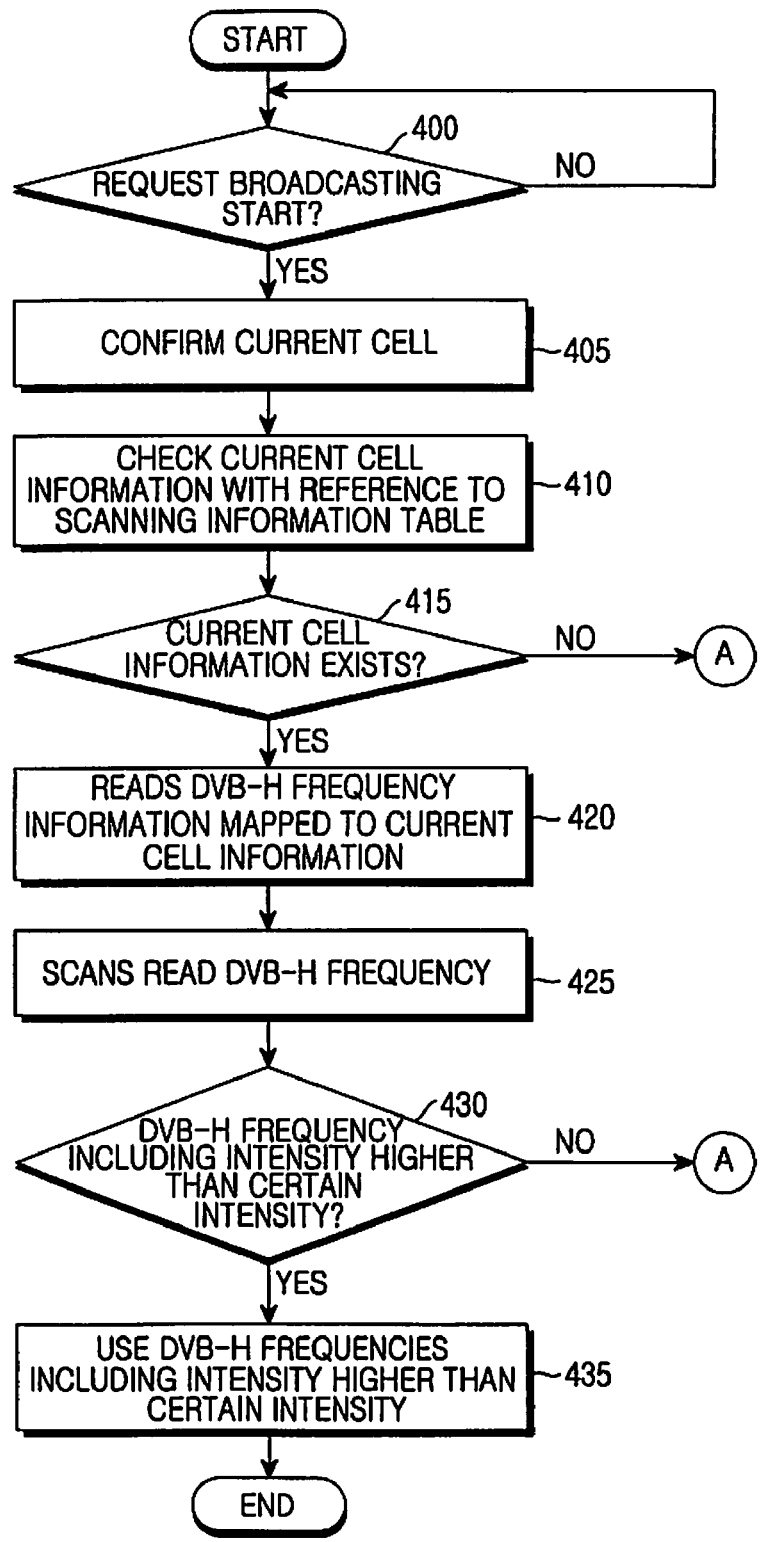
FIG. 4 and FIG. 5 are flow charts for DVB-H frequency scanning by using the scanning information table according to the present invention.

First, the DVB-H receiving terminal determines whether a user requests broadcasting to start in step 400. However, FIG. 4 shows a case where a DVB-H frequency scanning is performed when broadcasting starts, a DVB-H frequency scanning may also be performed when broadcasting area is changed according to movements of the DVB-H receiving terminal.

Figure 5:
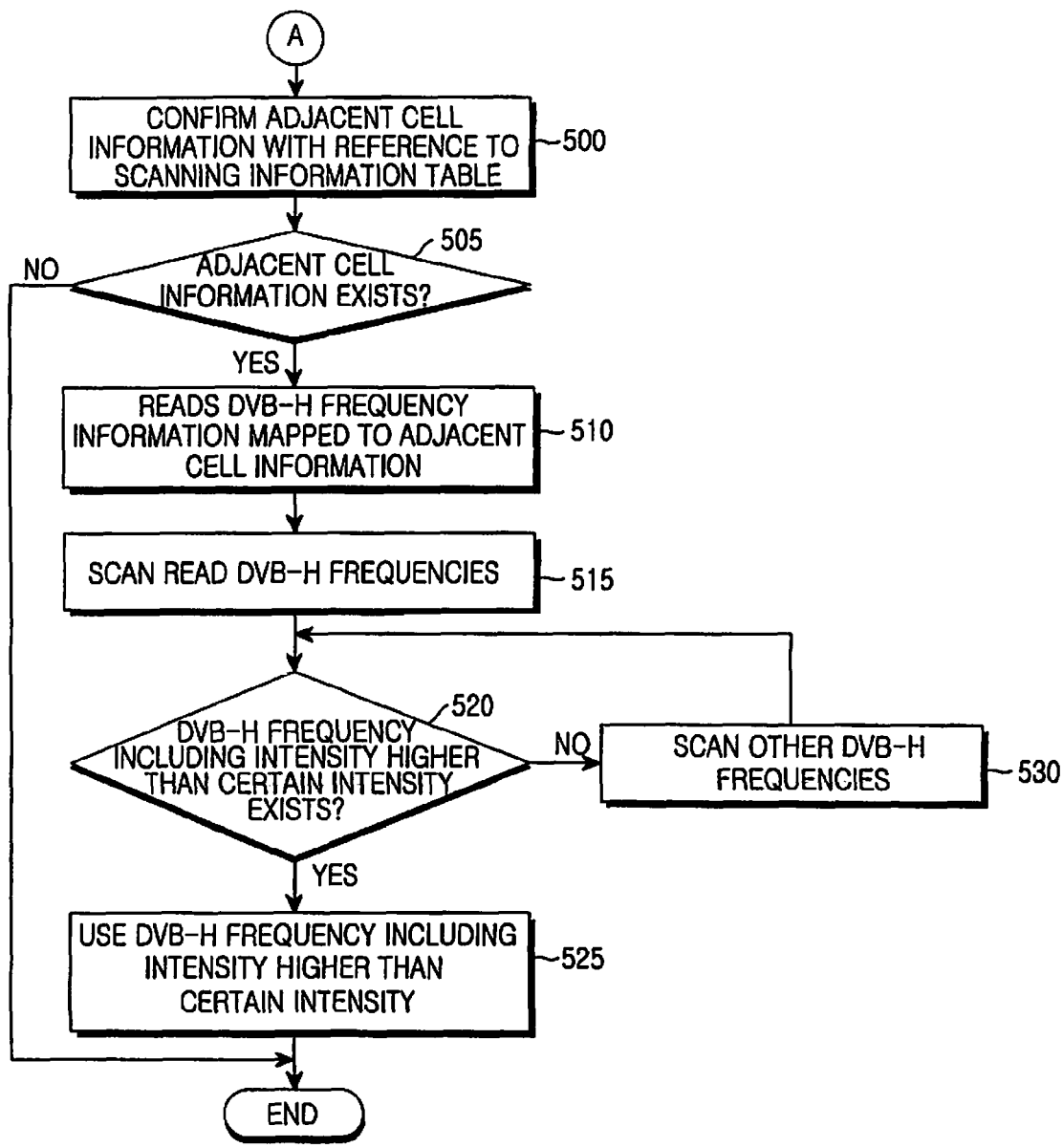

When there is a request for the start of broadcasting in step 400, the DVB-H receiving terminal determines the current cell where the DVB-H receiving terminal itself is located in step 405. That is, before DVB-H frequency scanning, the DVB-H receiving terminal determines a cell where the DVB-H receiving terminal itself is located. Then, the DVB-H receiving terminal checks the current cell information with reference to the scanning information table in step 410 and determines whether there exists the current cell information in the table in step 415. If there exists the current cell information as a result of the determination, the DVB-H receiving terminal proceeds to step 420. If not, the DVB-H receiving terminal proceeds to step 500 of FIG. 5. A symbol A is employed in order to show that step 415 of FIG. 4 and step 500 of FIG. 5 are linked to each other. Also, the same symbol A is employed in order to show that step 430 of FIG. 4 and step 500 of FIG. 5 are linked to each other.

First, if there exists the current cell information, the DVB-H receiving terminal reads the DVB-H frequency information mapped to the current cell information from the scanning information table in step 420. Then, the DVB-H receiving terminal preliminarily scans the read DVB-H frequency according to the present invention instead of scanning all of the DVB-H frequency ranges in step 425. The DVB-H receiving terminal determines whether there is a DVB-H frequency having intensity higher than a certain intensity, as a result of the scanning step described above in step 430. In this case, when there are one or more DVB-H frequencies mapped to one cell information, if the first read DVB-H frequency does not have an intensity higher than a certain intensity, the DVB-H receiving terminal scans DVB-H frequencies one by one in regular sequence and determines whether each of the DVB-H frequencies has an intensity higher than a certain intensity.

The DVB-H receiving terminal proceeds to step 435 and uses a DVB-H frequency having an intensity higher than a certain intensity if the DVB-H frequency has an intensity higher than a certain intensity as a result of the scanning and determination described above. Accordingly, the DVB-H receiving terminal is able to receive a digital broadcasting signal from a DVB-H transmission server by using the DVB-H frequency having intensity higher than a certain intensity.

When either the scanning information table includes no current cell information in step 415 or the read DVB-H frequency does not have an intensity higher than a certain intensity in step 430 as a result of scanning the read DVB-H frequency, the DVB-H receiving terminal proceeds to step 500 of FIG. 5 and determines information about a cell adjacent to a cell where the DVB-H receiving terminal itself currently belongs. The DVB-H receiving terminal proceeds to step 505 and determines whether the scanning information table includes the adjacent cell information. If the scanning information table includes the adjacent cell information, the DVB-H receiving terminal reads the DVB-H frequency information mapped to the adjacent cell information in step 510. In this case, there may be at least one or more read DVB-H frequencies. Accordingly, the DVB-H receiving terminal scans at least one or more read DVB-H frequencies in step 515, and determines whether there exists a DVB-H frequency having an intensity higher than a certain intensity as a result of scanning above in step 520. When there exists a DVB-H frequency having intensity higher than a certain intensity as a result of the determination above, the DVB-H receiving terminal proceeds to step 525, selects the DVB-H frequency having intensity higher than a certain intensity and uses the DVB-H frequency.

If there exists no DVB-H frequency having intensity higher than a certain intensity as a result of scanning in step 520, the DVB-H receiving terminal proceeds to step 530. That is, when the DVB-H frequency having an intensity higher than a certain intensity cannot be found by scanning the read DVB-H frequency, the DVB-H receiving terminal proceeds to step 530 and scans all the frequencies, which have not been scanned, from a low frequency to a high frequency in the UHF band and finds a DVB-H frequency having an intensity higher than a certain intensity. Similarly, if the scanning information table does not include the adjacent cell information in step 505, the DVB-H receiving terminal scans all of the DVB-H frequency ranges in the usual way.

According to the present invention described above, when it is necessary to find a DVB-H signal due to the start of DVB-H applications and changes in broadcasting area, the DVB-H receiving terminal preliminarily scans a prestored DVB-H frequency corresponding to the cell where the DVB-H receiving terminal itself belongs. The DVB-H receiving terminal is capable of more quickly finding an appropriate DVB-H frequency through the scanning described above so that the DVB-H receiving terminal can effectively minimize power consumption of the DVB-H receiving terminal. Even though the DVB-H receiving terminal cannot find an optimal DVB-H frequency in the current cell, if the DVB-H receiving terminal is aware of an adjacent cell information, it can continuously scan by using the DVB-H frequency for the adjacent cell information through using a scanning information table where corresponding DVB-H frequencies are mapped. Additionally, in a case where various cells overlap each other, though several DVB-H frequencies are mixed, the DVB-H receiving terminal scans the stored DVB-H frequencies one by one in response to the overlapped cells and selects an optimal DVB-H frequency having the highest intensity based on the broadcasting area so that it can remarkably reduce the time spent on using RF modules.

In addition, the DVB-H receiving terminal can count the number of DVB-H frequency scans in the corresponding cell in response to each cell information according to another embodiment of the present invention. The counted number of scans tells the frequency and the area, which have been used often by the DVB-H receiving terminal. According to the present invention, although DVB-H frequencies having an equal intensity are detected, the DVB-H receiving terminal can more quickly select the optimal DVB-H frequency.

According to the present invention as described above, the DVB-H receiving terminal has advantages in that it, in advance, uses a scanning preprocessing method related to a DVB-H frequency before finding the DVB-H signal so that it can remarkably lessen the time spent on using RF modules and reduce the power consumption. Further, the DVB-H receiving terminal also has another advantage in that it can quickly and efficiently scan the DVB-H frequencies according to the priority without scanning within all of the DVB-H frequencies ranges.

While the invention has been shown and described with reference to certain exemplary embodiments thereof, it will be understood by those skilled in the art that various changes in form and details may be made therein without departing from the spirit and scope of the invention as further defined by the appended claims.

What is claimed is:

1. A method for frequency scanning in a Digital Video Broadcasting-Handheld (DVB-H) receiving terminal, the method comprising the steps of:
    obtaining cell information of each of a plurality of cells and DVB-H frequencies for each of the plurality of cells, each of the DVB-H frequencies having an intensity higher than a predetermined intensity;
    mapping the DVB-H frequencies to the corresponding cell information and storing the DVB-H frequencies mapped to the cell information in a table;
    detecting a current cell in which the DVB-H receiving terminal is located when there is a request for DVB-H frequency scanning;
    determining if the table includes information about the current cell;
    scanning the DVB-H frequency corresponding to the information about the current cell when the table includes the information about the current cell; and
    obtaining system information from a digital broadcasting signal input by using the scanned DVB-H frequency, when the scanned DVB-H frequency has an intensity higher than the predetermined intensity,
    wherein storing the DVB-H frequencies mapped to the cell information in the table comprises:
    counting a number of times each of the plurality of cells have been scanned; and
    mapping the number of times to the corresponding cell information.

2. The method as claimed in claim 1, wherein the request for DVB-H frequency scanning occurs when DVB-H applications are started in response to a user request to start broadcasting or when the DVB-H receiving terminal moves from a DVB-H frequency-unreceivable shadow area to a receivable area.

3. The method as claimed in claim 1, when the scanned DVB-H frequency does not have an intensity higher than the predetermined intensity, further comprising:
identifying a cell adjacent to the current cell;
detecting whether information about the adjacent cell is included in the table; and
scanning the DVB-H frequency corresponding to the information about the adjacent cell, when the table includes the information about the adjacent cell.

4. The method as claimed in claim 1, when the DVB-H receiving terminal is located in an area where the current cell overlaps at least one other cell, further comprising:
determining if the table includes information about at least one other cell;
scanning the DVB-H frequency corresponding to the information about at least one other cell; and
selecting the DVB-H frequency having a highest intensity from among the DVB-H frequency corresponding to the information about the current cell and the DVB-H frequency corresponding to the information about at least one other cell.

5. The method as claimed in claim 1, further comprising:
detecting whether DVB-H frequencies having an equal intensity are detected when scanning the DVB-H frequency corresponding to the information about the current cell; and
selecting the DVB-H frequency corresponding to the cell having a highest number of DVB-H frequency scans from among the DVB-H frequencies having the equal intensity when the DVB-H frequencies having the equal intensity are detected.

6. A Digital Video Broadcasting-Handheld (DVB-H) receiving terminal for frequency scanning, the DVB-H receiving terminal comprising:
a memory for mapping a DVB-H frequency having an intensity higher than a predetermined intensity to cell information obtained when moving between cells, and storing the cell information in a table;
a digital broadcasting receiving unit for receiving DVB-H frequency information corresponding to a DVB-H signal when located in a cell area where the DVB-H signal exists;
a Radio Frequency (RF) unit for receiving RF signals from a base station located in each cell area; and
a controller for determining whether the DVB-H receiving terminal moves between the cell area by measuring a received signal intensity through the RF unit, obtaining information about the cell area and DVB-H frequencies having intensity higher than the predetermined intensity storing the cell information and the DVB-H frequencies in the memory, detecting a current cell where the DVB-H receiving terminal is currently located when there is a request for DVB-H frequency scanning, determining if the table includes information about the current cell, controlling to scan the DVB-H frequency corresponding to the information about the current cell, and obtaining system information from a digital broadcasting signal input by using the scanned DVB-H frequency, when the scanned DVB-H frequency has intensity higher than the predetermined intensity
wherein the controller stores the cell information and the DVB-H frequencies in the table by counting a number of times each of the cells have been scanned, and mapping the number of times to the cell information, respectively.

7. The DVB-H receiving terminal as claimed in claim 6, wherein the request for the DVB-H frequency scanning occurs when DVB-H applications are started in response to a user request to start broadcasting or when the DVB-H receiving terminal moves from a DVB-H frequency-unreceivable shadow area to a receivable area.

8. The DVB-H receiving terminal as claimed in claim 6, wherein when the scanned DVB-H frequency corresponding to the information about the current cell is not higher than the predetermined intensity, the controller determines whether the table includes information about an adjacent cell of the current cell and controls to scan the DVB-H frequency corresponding to the information about the adjacent cell, when the table includes the information about the adjacent cell.

9. The DVB-H receiving terminal as claimed in claim 6, wherein the controller determines if the table includes information about at least one other cell, controls to scan the DVB-H frequency corresponding to the information about at least one other cell, and selects the DVB-H frequency having a highest intensity from among the DVB-H frequency corresponding to the information about the current cell and the DVB-H frequency corresponding to the information about at least one other cell, when the DVB-H receiving terminal is located in an area of the current cell that overlaps at least one other cell.

* * * * *